May 3, 1966 M. C. LEMON ET AL 3,249,389
APPARATUS FOR CONVEYING ARTICLES
Filed July 14, 1964 2 Sheets-Sheet 1

Inventors
Norman S. Valentine
Maurice C. Lemon
By Watson, Cole, Grindle & Watson
Attorneys May 3, 1966 M. C. LEMON ET AL 3,249,389
APPARATUS FOR CONVEYING ARTICLES
Filed July 14, 1964 2 Sheets-Sheet 2

Inventors
Norman J. Valentini
Maurice C. Lemon
By Watson, Cole, Grindle & Watson
Attorneys ns are introduced into a conveying air current by means of a feeder member which may be a hopper or a conveyor belt, the articles entering past a pivotally movable member which minimises any reverse flow of the conveying air following the introduction of the articles into the air current.

The present invention particularly directed to an improvement of such apparatus wherein the articles are introduced by a suitable conveyor member into an upwardly moving air current by which such successive and discrete articles are carried initially in a vertical path to a suitable level for further conveyance or manipulation of the articles or for delivery selectively to a series of containers, the articles being then conveyed in a more or less horizontal direction to at least one discharge point.

This arrangement permits articles to be discharged directly into washing machines or alternatively the articles may be discharged into containers movable over or along overhead trackways by which they may be brought to a position over washing machines, being discharged from said containers into the washing machines.

If desired a plurality of outlets may be provided to which articles fed successively are selectively delivered under the control of an operator's keyboard.

At the receiving point the conveying apparatus may comprise a belt on which articles to be conveyed by the conveying apparatus are successively placed, said belt rising towards the rear at which point the articles are delivered into the upwardly moving air current, and a further movably mounted belt may be provided towards the upper rear end of the conveyor belt, this second belt being adapted to be deflected upwardly as articles are carried upwardly by the first conveyor belt, and closing on to the first belt after the articles have been passed into the vertical air current. A pivotally mounted and spring- or weight-actuated flap may also be provided above the second belt so as to provide closing means operative to prevent any return flow of air after articles have been delivered into the air current.

Figure 1:
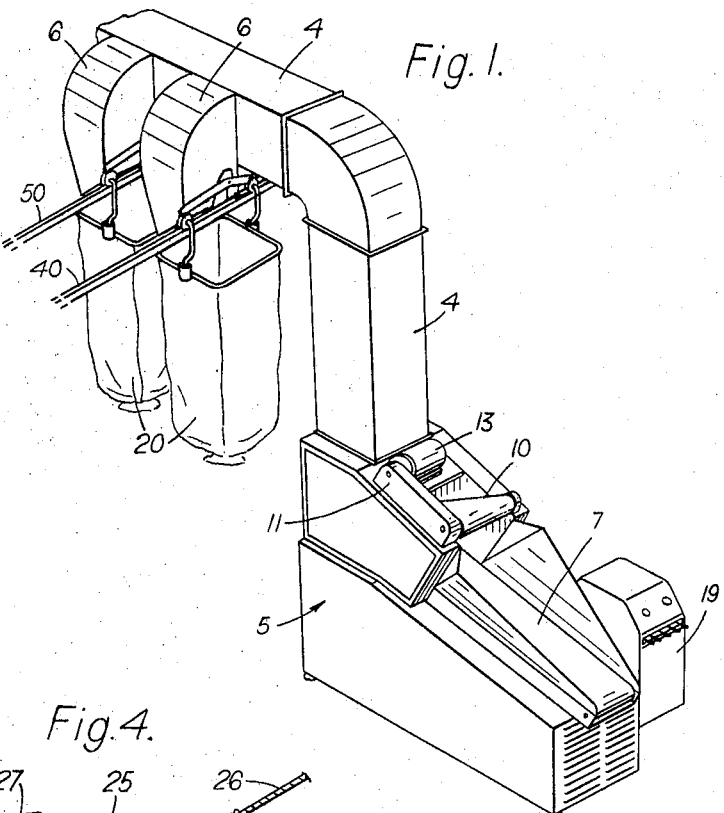
Figure 4:
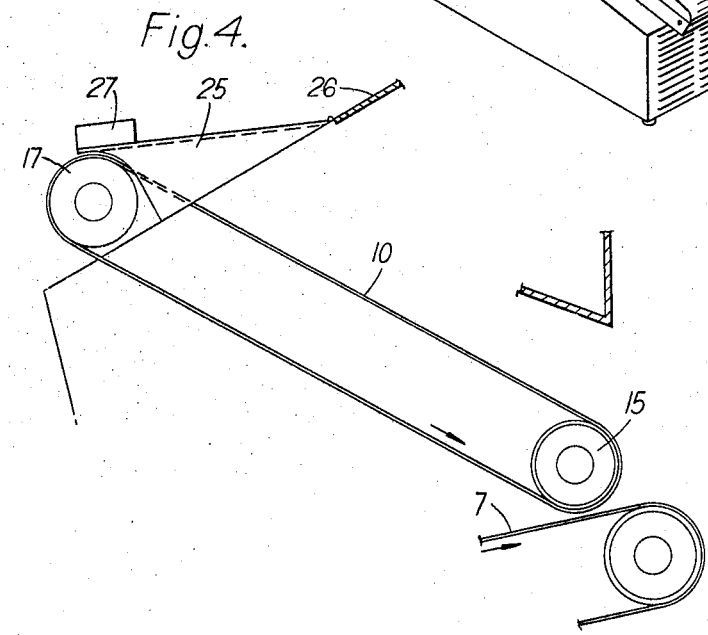
Figure 2:
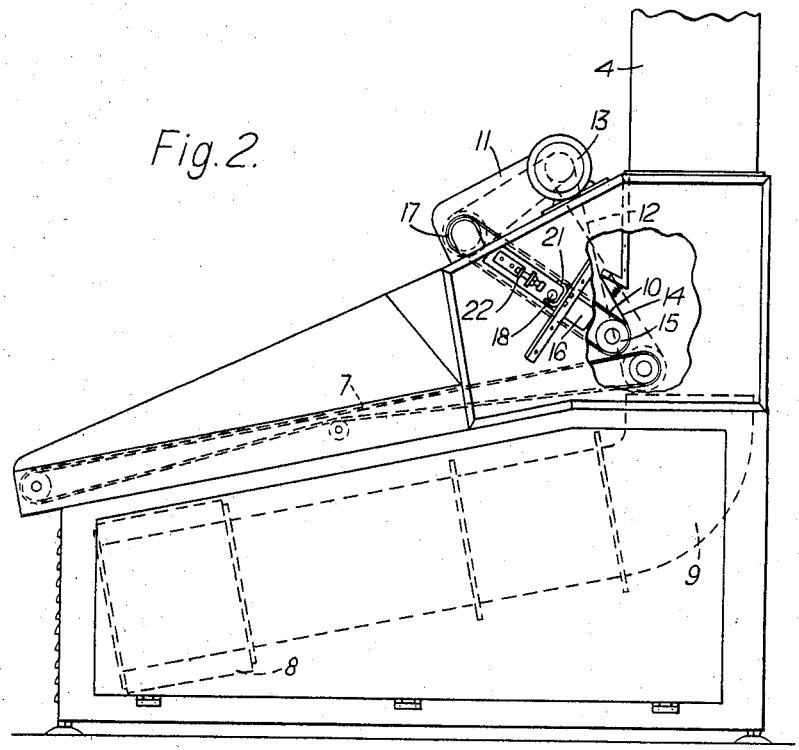
Figure 3:
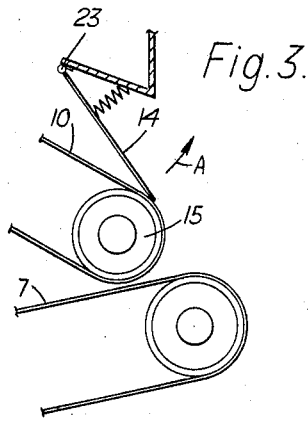

The features of the present invention are illustrated by way of example with reference to the accompanying drawings in which:

FIG. 1 is a general view of an article conveyance system for use in laundries and like establishments, the receiving unit for articles being conveyed being shown in outline form, FIG. 2 is a view in greater detail showing part of the receiving unit for articles to be conveyed, FIG. 3 is an explanatory view on a larger scale, and FIG. 4 is a view similar to FIG. 3 showing a modification of the invention.

As shown on the accompanying drawings, a conveyance system for articles for use in laundries includes a pneumatic conveyor duct 4 of circular or rectangular form including a vertically rising section at the base of which is disposed a receiving unit 5, the vertical section of the conveyor pipe merging into a substantially horizontal delivery section, which, in the embodiment illustrated, is provided with a plurality of outlets 6 to which articles may be selectively delivered, as explained in the parent specification under the control of an operator's keyboard 19 placed adjacent to the receiving unit 5.

The receiving unit 5 comprises a horizontal or nearly horizontal conveyor belt 7 on which articles to be conveyed can be successively placed, this being supported by a casing housing a fan and driving motor unit 8 for effecting conveyance of the articles. The air flow delivered by the fan passes through a curved delivery section 9 into the substantially vertical part of the duct 4 into the base of which the delivery end of the conveyor belt 7 opens so that articles placed on the belt are delivered successively into the vertical air current in the vertical duct 4. Thereby the articles are picked off the belt by the air current and conveyed in an initially upward direction.

The articles entering the vertical duct 4 preferably move past a downwardly and forwardly inclined second endless belt 10 the lower end of which presses yieldingly against the upper end of the belt 7. The belts 7 and 10 are driven by a driving belt 11 and by a crossed belt 12 respectively from a driving motor 13. The belt 10 is supported on a pulley 15 carried by a pivotal carrier arm 16 adapted to pivot around the axis of a top driving pulley 17 also supporting the belt, the pulley being driven by the motor 13. A pin 18 on the arm 16 moves between the limbs of a U-shaped stop member 21 and a belt tensioning device 22 forces the pulleys 15, 17 apart to maintain the belt 10 under proper tension.

It is necessary to prevent egress of air above the upper run of the belt 10, and for this purpose there may be provided a spring-urged pivotally movable flap or plate 14 as shown on FIGS. 2 and 3 which presses yieldingly against the belt 10 near the pulley 15 and placed at an oblique angle.

The lower end of the belt 10 is pushed upwardly by an article travelling on the belt 7 and this upward movement of the belt 10 presses against the flap 14 causing pivoting movement of the latter about the spindle 23, as indicated by the arrow A in FIG. 3 indicating the movements of the belt 10 and of the plate 14. If desired, the plate 14 may be adapted for operating an counter device to register the number of articles entering the conveying duct. The bottom edge of the plate 14 presses on the belt 10 and serves to minimise any backward pressure of the air after an article has been delivered into the duct 4.

An alternative to the provision of the flap or plate 14 is shown on FIG. 4 of the drawings. In this case a pivotally movable cover member 25 is supported on an upper cover section 26 of a casing surrounding the upper end of the belt 10 and partially embracing the driving pulley 17 for said belt. The cover 25 is subjected to the action of a spring or of a weight 27 which tends to retain the cover 25 in the position shown in FIG. 4 of the drawings and prevents egress of air from the casing 26, which is in communication with the vertical duct 4. The lower pulley 15 supporting the belt 10 can rise and fall freely as articles pass along the belt 7 and beneath the pulley 15. It will be observed that the casing 25 lies just clear of the belt 10 and the pulley 17 so that no friction arises at this point, but if for any reason articles being conveyed on the belt 7 are carried upwardly along the upper run of the belt 10 instead of being delivered into the vertical duct 4, such articles pass beneath the cover 25 and lift it against the action of the weight 27, permitting such articles to pass away from the belt 10 and drop back on to the lower section of the belt 7 by which they are again carried forwardly towards the vertical duct 4. After such articles have passed away from the pulley 17 the cover member 25 is again moved down to the normal position shown on the drawings by the action of the weight 27.

The vertical duct extends upwardly to a sufficient level to ensure that the articles are discharged from a substantially horizontal section of the duct 4 at a level which permits the articles to be received by containers 20 adapted to be brought beneath the various discharge outlets. The duct 4 may alternatively be connected to a distribution duct which may if desired be placed remotely from the vertical shaft and connected thereto by a suitable length of run of substantially horizontal conveying duct or pipeway, any changes in direction being allowed for by suitably curved connecting pipes in order that the articles being conveyed can flow smoothly from the receiving point to the various delivery points.

In the embodiments shown on FIG. 1 of the drawings, the containers 20 are retained beneath the delivery outlets 6 by means of suitable retaining means. For this purpose each container is supported from a rail support 40, 50 by means or V-shaped support rollers and is adapted to receive the articles from a suitably placed delivery chute.

What we claim is:

1. Article conveying apparatus comprising a belt conveyor intended to receive separate articles for conveyance, a vertical ductway disposed at the delivery end of said belt conveyor, said belt conveyor arranged to deliver articles singly into said ductway, air flow generating means to produce a vertical upward air current in said ductway to carry successive articles in an initially vertical path in the said ductway to a higher level for further conveyance of the articles to one or more discharge points, an auxiliary belt extending partially over said conveyor belt and inclined downwardly thereto, said auxiliary belt being in close proximity at its lower end to the end of the conveyor belt adjacent the vertical ductway to assist guiding successive articles into the ductway on said conveyor belt, and a pivoted sealing member pressed yieldingly towards said auxiliary belt to prevent reverse flow of air from said ductway as successive articles enter said ductway on said conveyor belt for direct admission to the air flow in said vertical ductway.

2. Article conveying apparatus as claimed in claim 1, comprising an article feeder unit including a table-like stand, said stand supporting the conveyor belt on its upper surface and said conveyor belt rising towards its rear end nearest the vertical ductway, and an air blower unit to produce the vertical upward air flow in said ductway, said unit disposed beneath said table member.

3. Article conveying apparatus according to claim 1, comprising an auxiliary belt mounting consisting of first and second pulleys, a pivotal frame interconnecting said pulleys, said frame being pivoted around the upper pulley so that the lower pulley is free to swing into contact with the conveyor belt and to exert pressure on articles travelling on said conveyor belt, a pivotally movable sealing flap member the free end of which is disposed adjacent to the lower pulley and means tending to press the free end of said flap against the auxiliary belt at said pulley.

4. Article conveying apparatus according to claim 1, comprising upper and lower pulleys supporting the auxiliary belt, a pivotally movable sealing member the free edge of which is disposed adjacent to the upper pulley and yielding means for urging said free edge of said sealing member towards said upper pulley.

References Cited by the Examiner

UNITED STATES PATENTS

| | | | |
|---|---|---|---|
| 1,420,015 | 6/1922 | Bernert | 302—36 |
| 1,979,176 | 10/1934 | Schicht | 302—36 |
| 3,141,705 | 7/1964 | Valentine | 302—28 |

EVON C. BLUNK, *Primary Examiner.*

ANDRES H. NIELSEN, *Examiner.*